United States Patent [19]

Strait

[11] Patent Number: 5,630,346

[45] Date of Patent: May 20, 1997

[54] PORTABLE FLANGE FACER

[75] Inventor: David S. Strait, Newberg, Oreg.

[73] Assignee: Climax Portable Machine Tools, Inc., Newberg, Oreg.

[21] Appl. No.: 432,979

[22] Filed: May 2, 1995

[51] Int. Cl.$^6$ ...................................................... B23B 5/00
[52] U.S. Cl. .............................. 82/113; 82/129; 82/132
[58] Field of Search ............................... 82/113, 128, 131, 82/132, 133

[56] References Cited

U.S. PATENT DOCUMENTS

| | | |
|---|---|---|
| 3,733,939 | 5/1973 | Paysinger et al. . |
| 4,043,222 | 8/1977 | Dudek . |
| 4,314,491 | 2/1982 | Hartmann et al. ........................ 82/128 |
| 4,411,178 | 10/1983 | Wachs et al. ........................ 82/131 X |
| 4,483,223 | 11/1984 | Nall et al. ........................... 82/128 X |
| 4,543,861 | 10/1985 | Kwech et al. . |
| 4,656,898 | 4/1987 | Hunt et al. . |
| 4,677,884 | 7/1987 | Kwech et al. . |
| 4,852,435 | 8/1989 | Hunt . |
| 4,981,055 | 1/1991 | VanderPol et al. ................... 82/128 X |
| 4,990,037 | 2/1991 | Strait . |
| 5,050,291 | 9/1991 | Gilmore ................................ 82/128 X |

*Primary Examiner*—M. Rachuba
*Assistant Examiner*—Henry Tsai
*Attorney, Agent, or Firm*—Smith-Hill and Bedell

[57] ABSTRACT

A portable machine tool comprises a main spindle and a machine body that is rotatable relative to the main spindle. A take-off shaft is mounted in the machine body and is rotatable relative to the machine body, and a rocker arm is rotatable about the axis of the take-off shaft. A cam and follower mechanism converts rotation of the machine body to reciprocating rotation of the rocker arm, and a releasable clutch mechanism that is effective between the rocker arm and the take-off shaft can be switched between a first state in which it converts reciprocating rotation of the rocker arm to unidirectional rotation of the take-off shaft and a second state in which reciprocating rotation of the rocker arm has no effect on the take-off shaft.

11 Claims, 10 Drawing Sheets

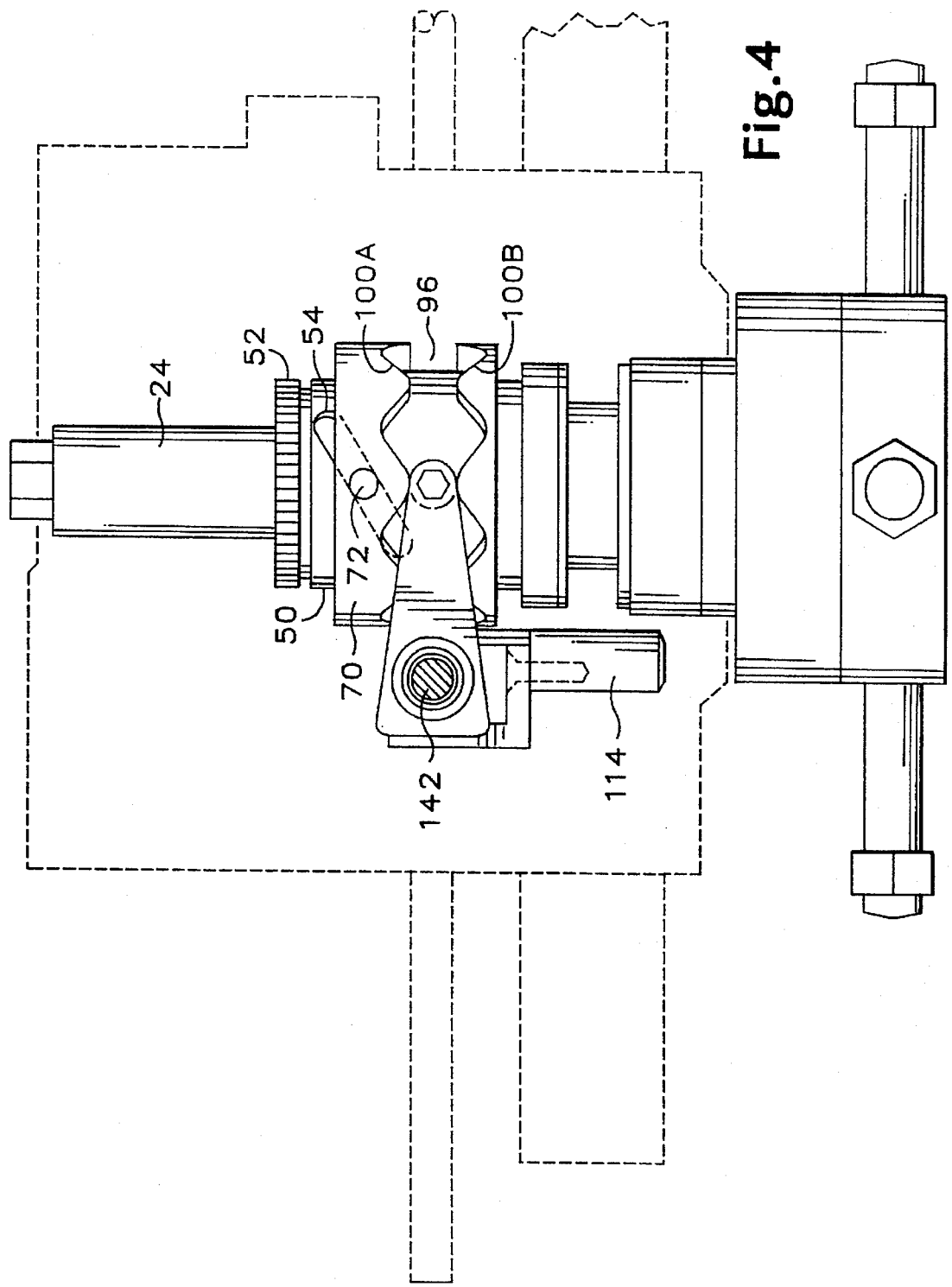

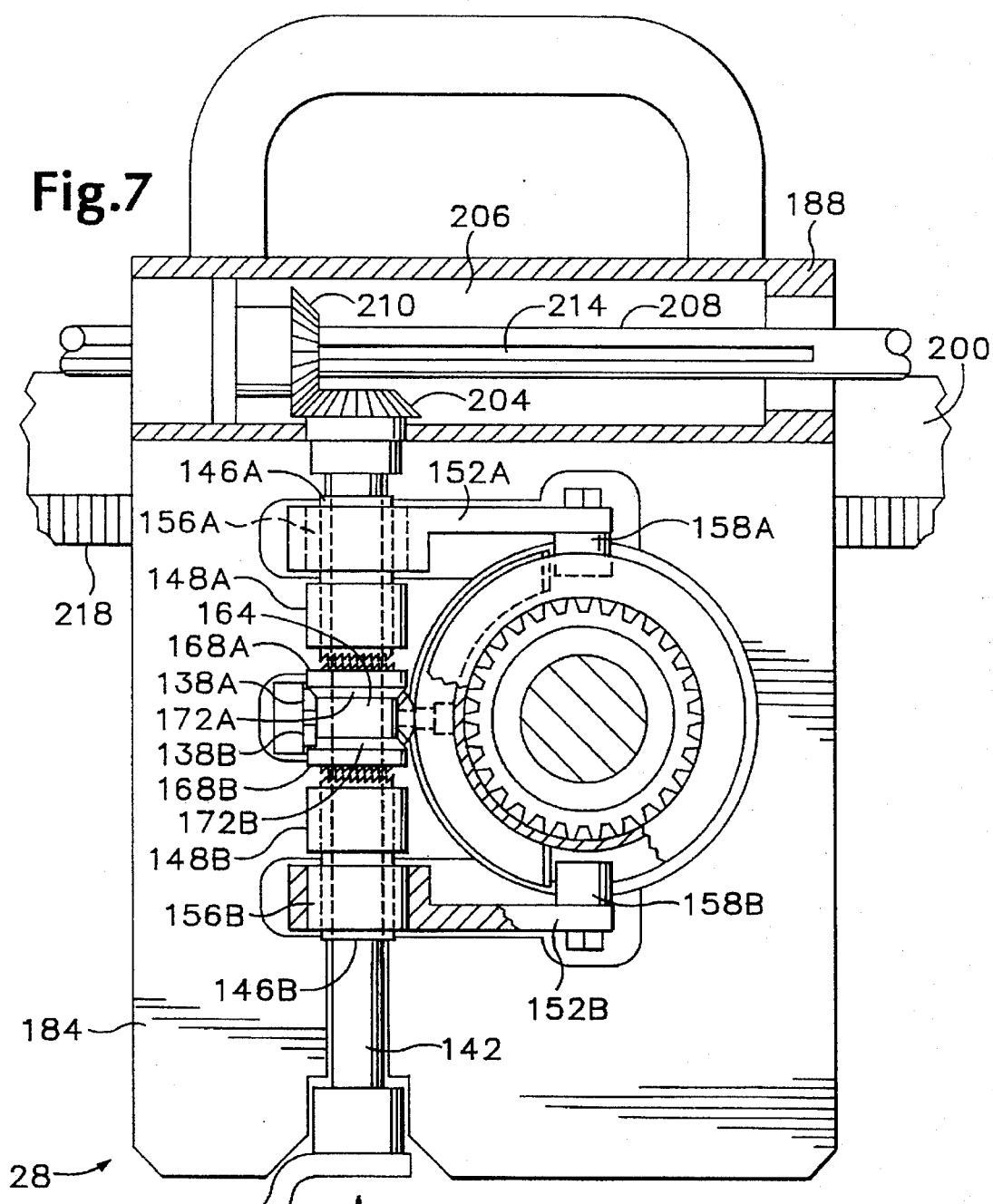
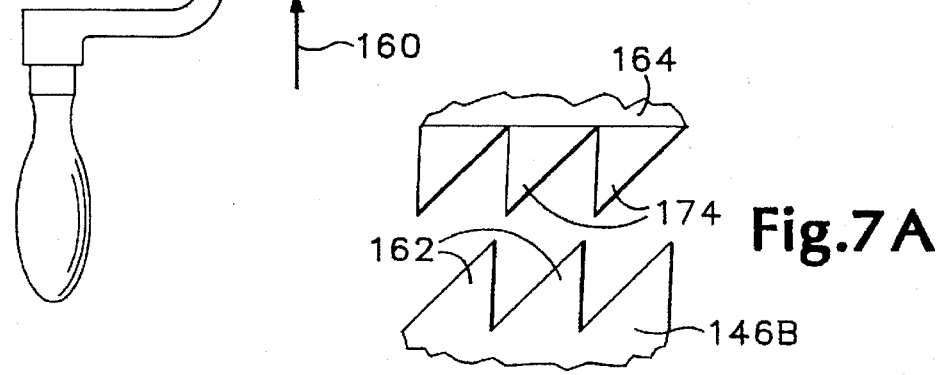
Fig.7
Fig.7A

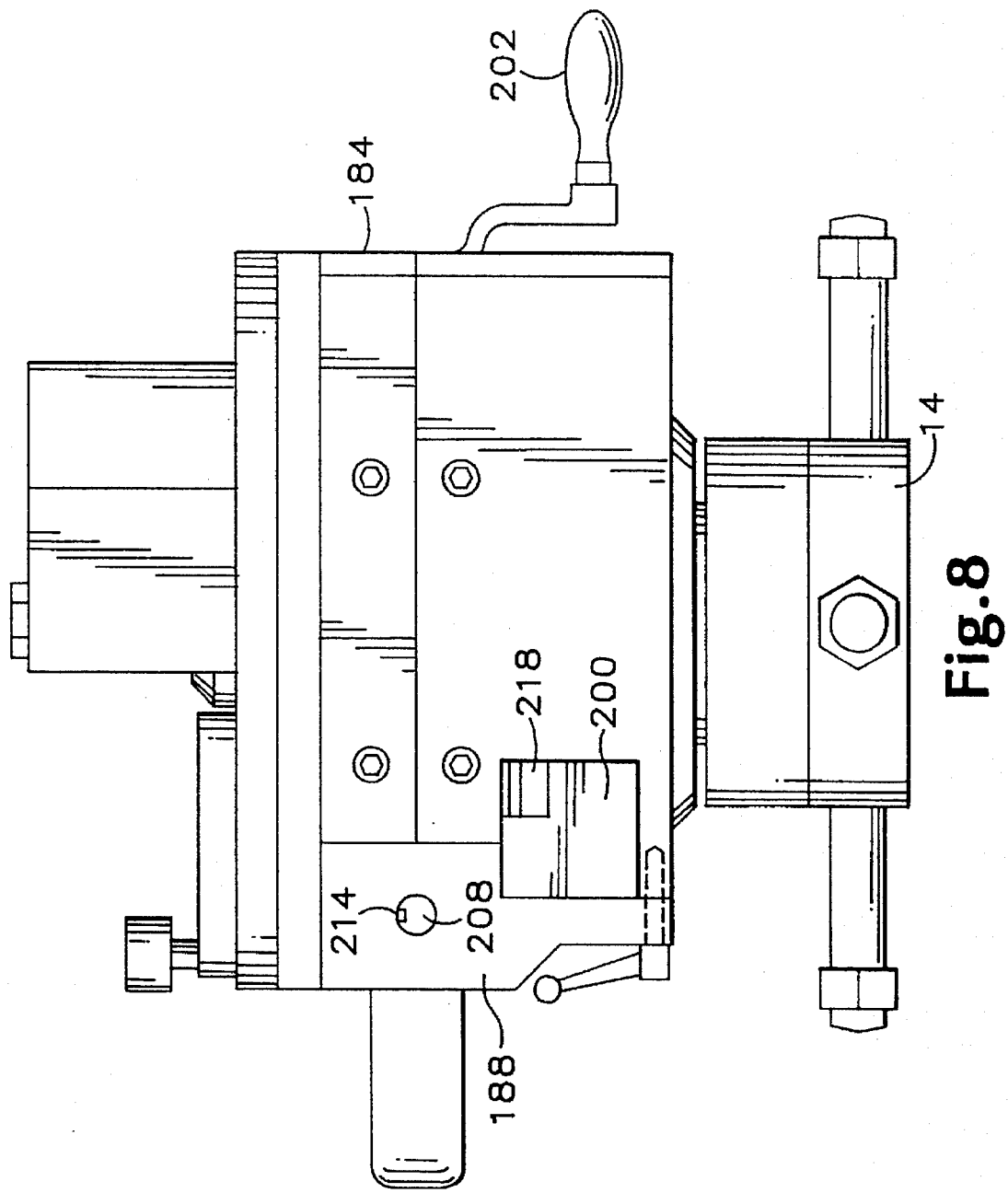

PORTABLE FLANGE FACER

BACKGROUND OF THE INVENTION

This invention relates to a portable machine tool and in particular to a portable flange facer.

Many industrial plants have systems of interconnected pipes for conducting gases and liquids. In many situations, two pipes are connected together by flanges, or a pipe may be connected to a vessel by a flange. The face of a flange may be subject to deterioration or other damage, and in order to prevent leakage caused by such deterioration, it is necessary to repair the flange by re-facing or re-grooving. This may be accomplished by depositing metal on the damaged flange and then machining the metal partially to leave a satisfactory surface. It may be inconvenient to remove a large pipe from the pipe system in which it is installed in order that it may be taken to a machine shop for repairing, and as a result, portable flange facers have been developed to perform the refacing and re-grooving in the field.

U.S. Pat. No. 4,852,435 discloses a portable flange facer that comprises a chuck that is fitted inside the bore of the pipe whose flange is being repaired and a machine body that is clear of the pipe when the chuck is mounted. A motor that is effective between the chuck and the machine body causes the machine body to rotate relative to the chuck. A tool bar extends through the machine body and carries a tool head. The tool bar is fed lengthwise as the machine body rotates.

In a portable flange facer, it may be desirable to be able to reverse the direction of feed of the tool head, e.g. from inward feed to outward feed. In the flange facer shown in U.S. Pat. No. 4,852,435, the feed direction can be reversed by demounting a feed slave unit from the machine body and reinstalling it in an inverted orientation. Naturally, this necessitates that rotation of the machine body be stopped. At times it would be more convenient if the feed direction could be reversed without its being necessary to stop rotation of the machine body, but in this case safety considerations dictate that the control member for accomplishing the reversal not be mounted on the machine body.

Many machine tools employ pneumatic drive motors. In a pneumatic drive motor, compressed air is supplied to the motor and is exhausted into the ambient atmosphere through a rather small port. This localized sudden reduction in pressure generates a substantial level of noise.

SUMMARY OF THE INVENTION

In accordance with a first aspect of the present invention there is provided a portable machine tool comprising a main spindle having a central axis, a machine body that is rotatable relative to the main spindle about said central axis, a take-off shaft that is mounted in the machine body and is rotatable relative to the machine body about a second axis, a first coupling member that is rotatable about said second axis, a mechanism for converting relative rotation of the machine body and the main spindle about said central axis to reciprocating rotation of the first coupling member about said second axis, and a converting means effective between the first coupling member and the take-off shaft and having at least a first state in which it converts reciprocating rotation of the first coupling member to unidirectional rotation of the take-off shaft in a first rotational sense and also having at least a second state, and a switch means for switching the converting means between its first and second states.

In accordance with a second aspect of the present invention there is provided a portable machine tool comprising a main spindle having a central axis, a machine body that is rotatable relative to the main spindle about said central axis, a take-off shaft that is mounted in the machine body and is rotatable relative to the machine body about a second axis, first and second coupling members that are rotatable about said second axis, a mechanism for converting relative rotation of the machine body and the main spindle about said central axis to reciprocating rotation of the first and second coupling members about said second axis, and a converting means effective between the first coupling member and second coupling members and the secondary shaft and having a first state in which it converts reciprocating rotation of the first coupling member to unidirectional rotation of the secondary shaft in a first rotational sense, a second state in which it converts reciprocating rotation of the second coupling member to unidirectional rotation of the secondary shaft in a second rotational sense, and a third state in which the first and second coupling members are uncoupled from the take-off shaft, and a switch means for switching the converting means among its first, second, and third states.

BRIEF DESCRIPTION OF THE DRAWINGS

For a better understanding of the invention, and to show how the same may be carried into effect, reference will now be made, by way of example, to the accompanying drawings, in which FIG. 2A is a sectional view on the line IIA—IIA of FIG. 2, FIG. 4 is a view illustrating the main spindle of the flange facer and a wave cam ring mounted on the main spindle, the machine body being shown in dashed line in FIG. 4, FIG. 7 is a sectional view on the line VII—VII of FIG. 1, FIG. 7A is an enlarged view of a detail of FIG. 7, FIG. 8 is a left side elevation of the flange facer.

DETAILED DESCRIPTION

Figure 1:
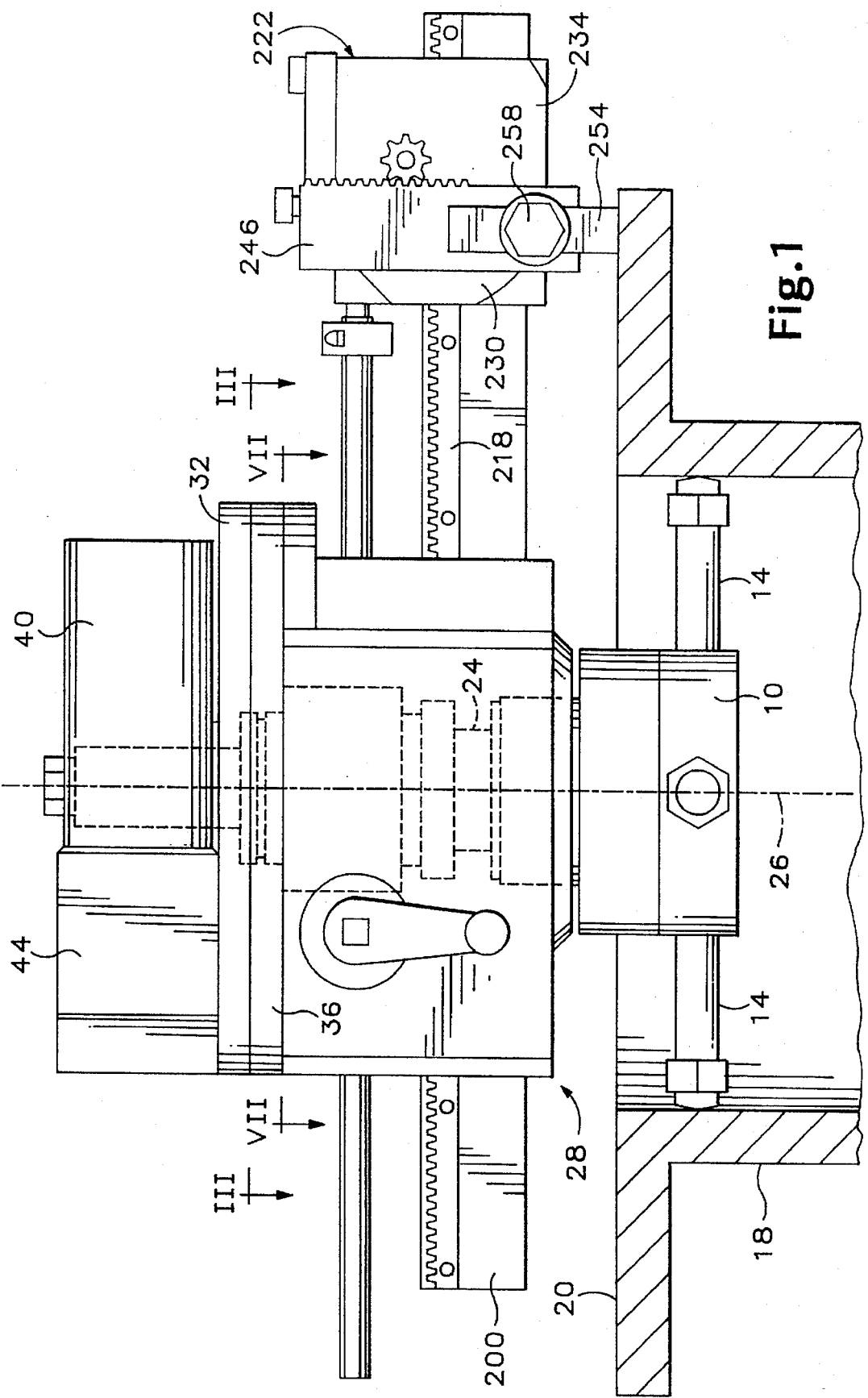
FIG. 1 is a front elevation illustrating generally a flange facer having a main spindle and a machine body, installed for repairing a flange at the end of a pipe.

Words of orientation employed in the following description of the flange facer relate to the orientation shown in FIG. 1, but it will be appreciated that the flange facer may be used in other orientations depending on the orientation of the flange that is to be faced.

The portable flange facer that is illustrated in the drawings comprises a chuck 10 from which four equiangularly spaced jacks 14 project radially into engagement with the interior surface of a pipe 18 having a flange 20 that is to be faced. The manner in which the jacks 14 are actuated may be conventional.

A main spindle 24 having a central axis 26 extends upwardly from the chuck 10 and through a machine body 28. The main spindle is fixed relative to the chuck 10 and is formed with two grooves 30 (FIG. 5), which extend parallel to the axis 26 and are angularly spaced by 180° about the axis 26. The machine body is supported on the main spindle by suitable bearings (not shown) that allow the machine body to rotate about the central axis of the spindle but do not permit axial movement of the machine body relative to the main spindle. A motor mount plate 32 that is located above the machine body 28 is fixed relative to the spindle 24.

Figure 2:
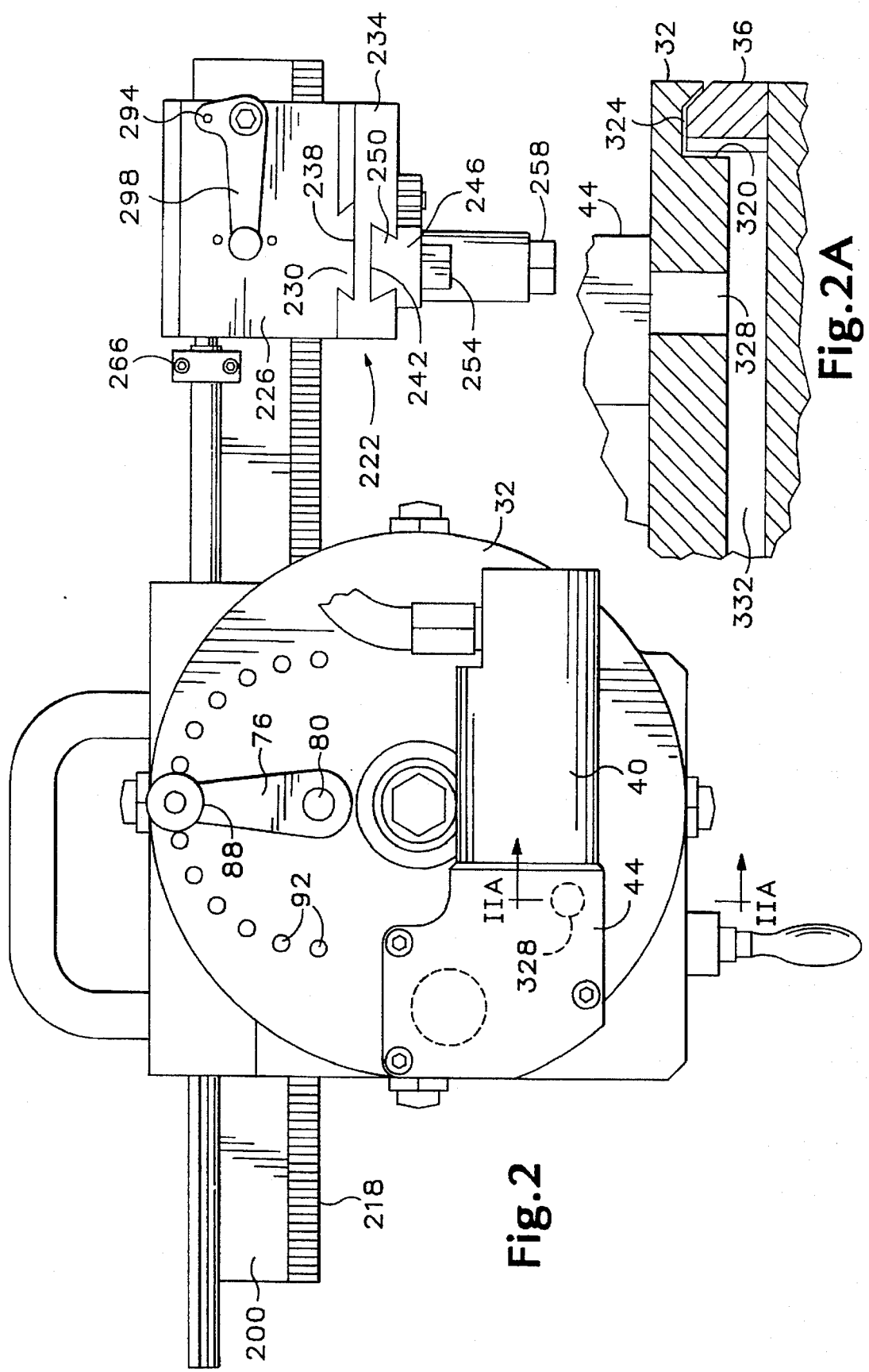
FIG. 2 is a top plan view of the flange facer.
Figure 3:
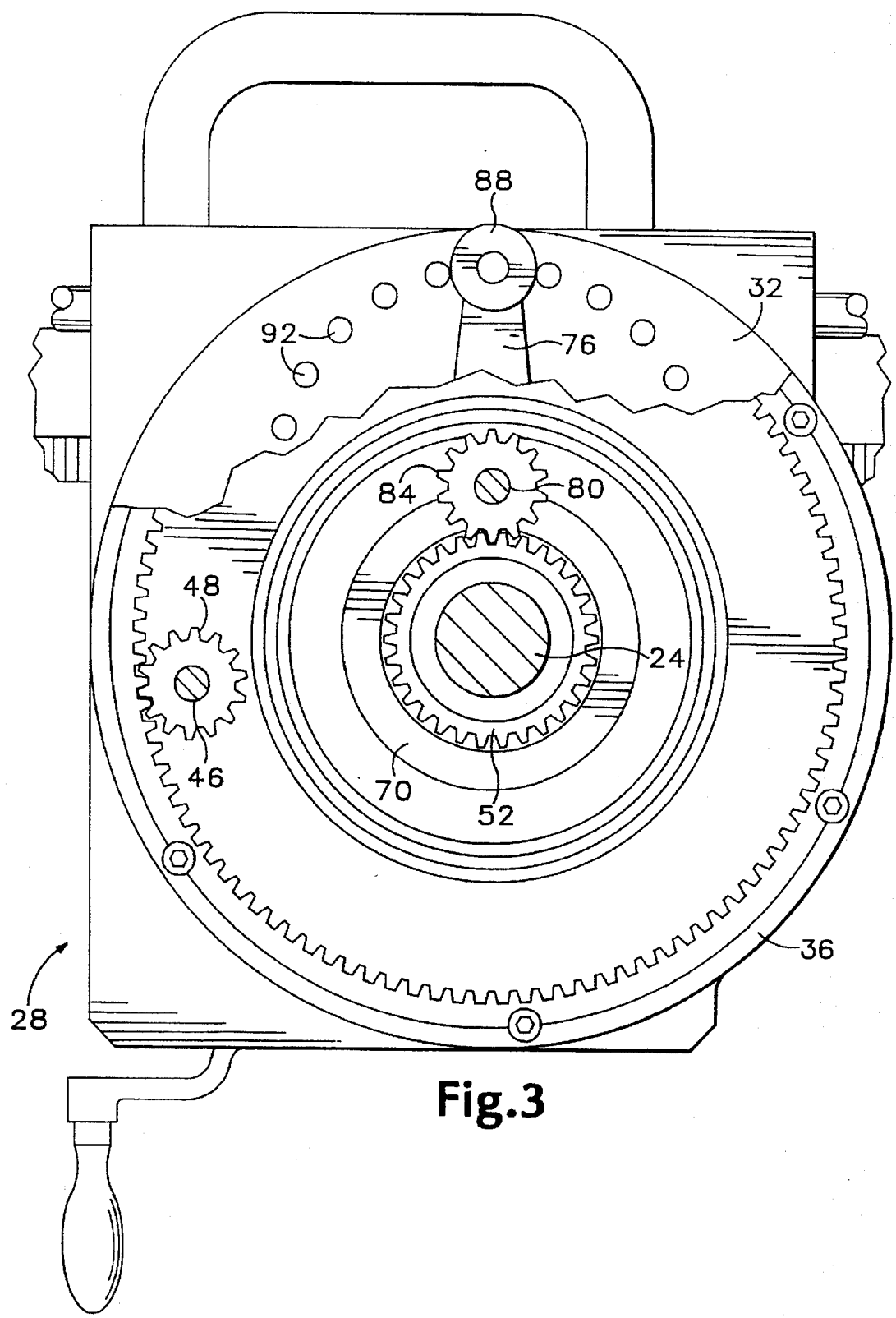
FIG. 3 is partly a top plan view of the flange facer and partly a sectional view on the line III—III of FIG. 1.

Referring to FIGS. 1, 2, and 3, the machine body 28 includes an internally toothed main drive ring 36, which is located immediately below the motor mount plate 32. A pneumatic motor 40 having a drive shaft (not shown) is attached to a gear box 44 and the gear box 44 is attached to the motor mount plate 32. The gear box 44 contains gears (not shown) that couple the motor's drive shaft to an output shaft 46 that extends through a hole in the motor mount plate and carries a drive pinion 48. The drive pinion 48 is meshed with the main drive ring 36, so that when compressed air is supplied to the motor 40, the motor drives the drive pinion 48 through the gear box 44 and the drive pinion 48 drives the machine body through the main drive ring 36 to rotate counter-clockwise about the main spindle 24 when viewed from above.

Referring to FIG. 4, a tubular cam locating gear 50 is fitted over the main spindle 24. Suitable bearings (not shown) allow the cam locating gear to rotate relative to the spindle 24 but prevent axial movement of the gear 50 relative to the spindle. The cam locating gear 50 has a spur gear 52 at its upper end and is formed with two helical cam slots 54 below the spur gear 52. Each of the cam slots has an angular extent of 90° about the central axis 26, and the two cam slots are offset from each other by 180° about the central axis 26.

Surrounding the cam locating gear 50 is a wave cam ring 70. Two pins 72 that are fixed to the wave cam ring in axially aligned relationship extend radially inward from the wave cam ring, pass through the cam slots 54 respectively, and enter the grooves 30 respectively. Engagement of the pins 72 in the grooves 30 holds the wave cam ring against rotation relative to the spindle but allows limited axial movement of the wave cam ring relative to the spindle. Interference between the pins 72 and the cam locating gear 50 limits the range of rotational movement of the cam locating gear 50 relative to the main spindle 24 and translates rotation of the cam locating gear relative to the spindle 24 into axial movement of the wave cam ring 70 relative to the spindle.

Referring to FIGS. 2 and 3, a control arm 76 is mounted on a shaft 80 that extends through a hole in the motor mount plate 32 and allows the control arm to pivot relative to the motor mount plate through an angular range of about 180°. The shaft 80 carries a pinion 84 at its lower end. The pinion 84 meshes with the spur gear 52, so that when the control arm is swung through its angular range of movement, the cam locating gear 50 is rotated through about 90° relative to the main spindle 24.

A spring-loaded detent knob 88 is fitted on the control arm and carries a pin (not shown) that projects toward the motor mount plate. The motor mount plate is formed with recesses 92 for receiving the pin at several locations along the path of movement of the detent knob 88. In this manner, the control arm 76 can be held in any one of several preset angular positions, and hence the wave cam ring 70 can be held in any one of several axial positions along the main spindle 24. The position of the control arm 76 when at the center of its arc is referred to herein as the neutral position, and the corresponding position of the wave cam ring 70 also is referred to as the neutral position.

Figure 6:
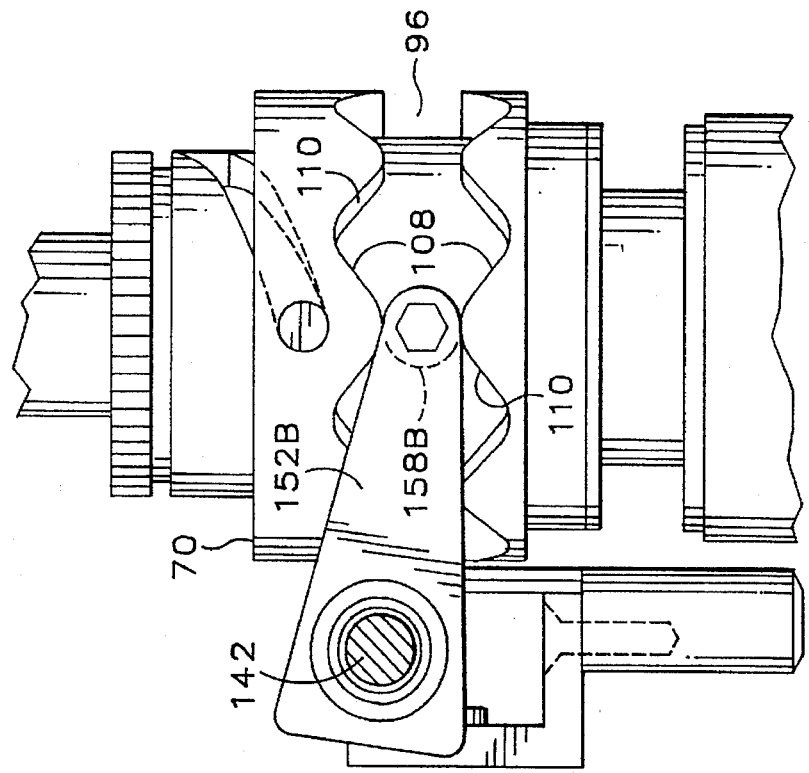
FIG. 6 is a view similar to FIG. 5 but with the wave cam ring in a different position relative to the main spindle.
Figure 5:
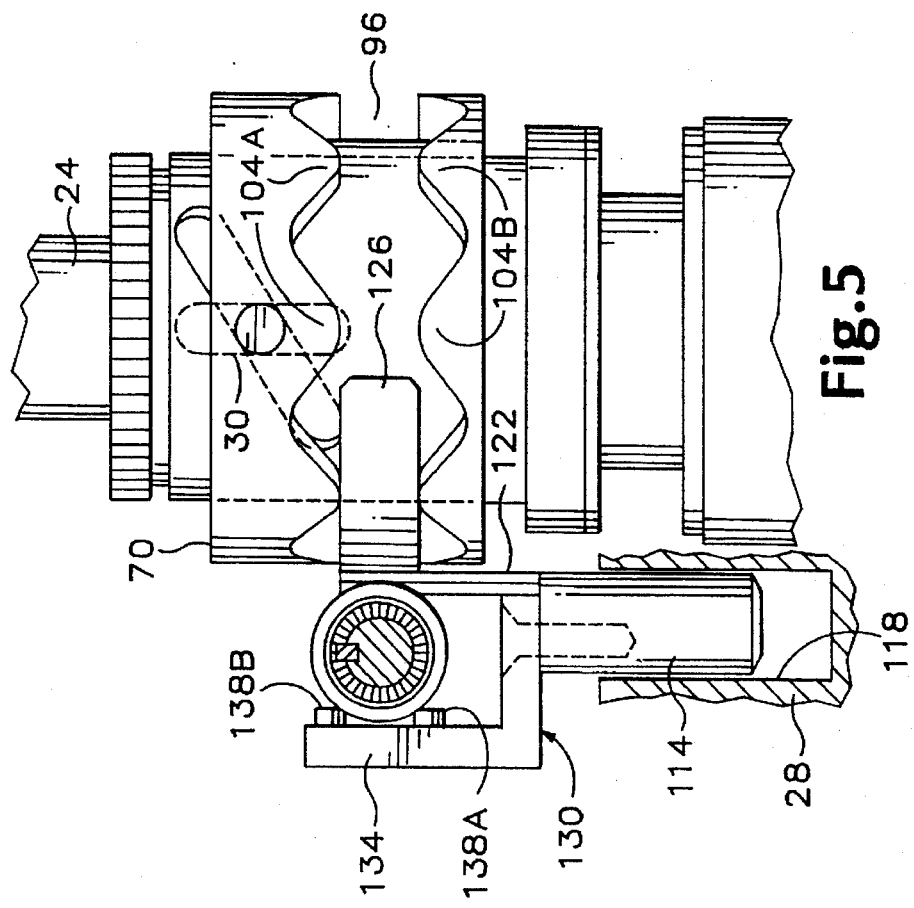
FIG. 5 is an enlarged view of a detail of FIG. 4.

Referring to FIGS. 4–6, the wave cam ring 70 is generally cylindrical in form and has a peripheral slot 96 between two cam tracks 100A and 100B. Each cam track defines eight lobes 104, and each lobe is defined between an ascending surface 108 and a descending surface 110 that converge toward the other cam track. The terms "ascending" and "descending" as used herein in relation to the surfaces defining the cam lobes are not related to the orientation of the main spindle.

A shift yoke guide stub 114 is fitted slidingly in a bore 118 that is formed in the machine body 28 parallel to the central axis of the main spindle 24. The guide stub 114 has an upward extension 122. An arcuate shift yoke 126 is attached to the upward extension 122 and is fitted in the peripheral slot 96 of the wave cam ring. A shift pin support 130 is attached to the guide stub 114 and has a vertical arm 134 from which two horizontal shift pins 138A and 138B extend toward the shift yoke 126. When the wave cam ring is moved along the spindle 24 as a result of rotation of the cam locating gear about the spindle, the shift yoke 126 and the guide stub 114 are likewise moved, and with them the pins 138A and 138B.

Referring to FIGS. 4–7, a power take-off shaft 142 extends within two feed direction bushings 146A and 146B, which are supported within the machine body 28 by roller clutches 148A and 148B respectively. The power take-off shaft 142 is disposed perpendicular to the main spindle 24 and spaced therefrom. Two rocker arms 152A and 152B are mounted on the take-off shaft 142 by means of roller clutches 156A and 156B respectively. It will become apparent from the following description that the rocker arms are able to rock about the central axis of the take-off shaft 142. The rocker arms 152 extend toward the take-off shaft 142, and each is provided at its free end with a roller 158 that is located in the peripheral slot 96 between the cam tracks of the wave cam ring 70 and serves as a cam follower. The diameter of each roller 158 is less than the minimum distance between two opposing lobes 104 of the wave cam ring. Each rocker arm 152 is biased by a spring (not shown) toward an equilibrium position, so that when the wave cam ring 70 is in its neutral position, the rollers 158 are clear of the two cam tracks 100.

In the following description of the transmission of drive from the wave cam ring 70 to the take-off shaft 142, references to the direction of rotation of an element about the axis of the take-off shaft 142 relate to the element when seen in the direction of the arrow 160 in FIG. 7.

The rocker arm 152A is associated with counter-clockwise rotation of the take-off shaft 142 whereas the rocker arm 152B is associated with clockwise rotation of the take-off shaft 142.

The roller clutch 156B transmits clockwise torque from the rocker arm 152B to the feed direction bushing 146B but allows the rocker arm 152B to rotate relative to the bushing 146B in the counter-clockwise direction, and similarly the roller clutch 156A transmits counter-clockwise torque from the rocker arm 152A to the feed direction bushing 146A but allows the rocker arm 152A to rotate relative to the bushing 146A in the clockwise direction. The roller clutches 148A and 148B allow the feed direction bushings 146A and 146B to rotate relative to the machine body in the counter-clockwise direction and the clockwise directions respectively, but prevent rotation of the bushings 146 in the respective opposite directions.

Referring to FIG. 6, when the wave cam ring 70 is below its neutral position, and the machine body rotates about the spindle 24, the camming action of the ascending edges of the upper cam track 100A acting on the rollers 158 repeatedly forces the rocker arms 152 in the clockwise direction and the descending edges allow the rocker arms 152 to return in the counter-clockwise direction toward the equilibrium position. The clutch 156B transmits clockwise torque from the arm 152B to the bushing 146B, and the clutch 148B allows the bushing 146B to rotate in the clockwise direction relative to the machine body. Similarly, when the wave cam ring 70 is above its neutral position, and the machine body rotates about the spindle 24, the camming action of the ascending edges of the lower cam track 100B acting on the rollers 158 repeatedly forces the rocker arms 152 in the counter-clockwise direction and the descending edges allow the rocker arms 152 to return in the clockwise direction toward the equilibrium position. The clutch 156A transmits counter-clockwise torque from the arm 152A to the bushing 146A, and the clutch 148A allows the bushing 146A to rotate in the counter-clockwise direction relative to the machine body.

Referring to FIGS. 7 and 7A, each of the feed direction bushings 146 is provided at its end that is nearer the other bushing 146 with dogging teeth 162, and between the two sets of teeth is a coupling sleeve 164 that is keyed to the take-off shaft 142 and is displaceable lengthwise thereof. The coupling sleeve 164 has two end portions 168A and 168B and a groove therebetween having sloping flanks 172A and 172B. The coupling sleeve is located between the shift yoke and the vertical arm, and the shift pins 138A and 138B project into the groove between the flanks 172. Clearance between the pins 138 and the flanks 172 allows a small amount of axial play in the position of the coupling sleeve relative to the pins 138, but if the shift pin support 130 is raised or lowered, the pin 138A or 138B engages the flank 172A or 172B and urges the coupling sleeve toward the feed direction bushing 146A or 146B. Thus, the elements 114, 126, 130, and 138 translate vertical movement of the wave cam ring 70 to horizontal movement of the coupling sleeve 164. The play between the pins 138 and the flanks 172 is sufficiently small that when the wave cam ring is in its neutral position, the coupling sleeve 164 is in a neutral position in which it is spaced from the feed direction bushings 146. When the wave cam ring is moved downward from its neutral position, the upper shift pin 138B engages the flank 172B and displaces the coupling sleeve toward the bushing 146B whereas when the wave cam ring is moved upward, the lower shift pin 138A engages the flank 172A and displaces the sleeve into engagement with the bushing 146A.

The two end portions 168A and 168B of the coupling sleeve 164 are formed with dogging teeth 174 that are complementary to the dogging teeth 162 on the feed direction bushings 146A and 146B respectively. Therefore, when the coupling sleeve 164 is displaced toward the bushing 146A, for example, the dogging teeth on the end portion 168A of the sleeve 164 engage the dogging teeth of the bushing 146A and counter-clockwise torque is transmitted to the take-off shaft 142 as the rocker arm 152A is forced in the counter-clockwise direction. If the torque applied to the take-off shaft 142 through the coupling sleeve 164 is resisted by a load, the clutch 148A prevents clockwise rotation of the shaft 142 as the rocker arm 152A returns toward its equilibrium position.

The coupling sleeve 164 and the mechanism for pushing the sleeve into engagement with either of the feed direction bushings ensures that the take-off shaft 142 is positively disconnected from the two feed direction bushings when the wave cam ring is in its neutral position.

When viewed in the radially inward direction, the dogging teeth 162 of the bushings 146 are generally triangular, having a leading face and a trailing face that converge from a base toward an apex, the angle between the leading face and the base being obtuse. The dogging teeth 174 of the coupling sleeve 164 are similarly formed. Therefore, when the dogging teeth of the sleeve are brought into engagement with the dogging teeth of one of the feed direction bushings, the force between the leading face of the tooth of the feed direction bushing and the corresponding face of the tooth of the sleeve has a component that retains the teeth in engagement. A positive force is required in order to displace the sleeve 164 out of engagement with the feed direction bushing.

Figure 9:
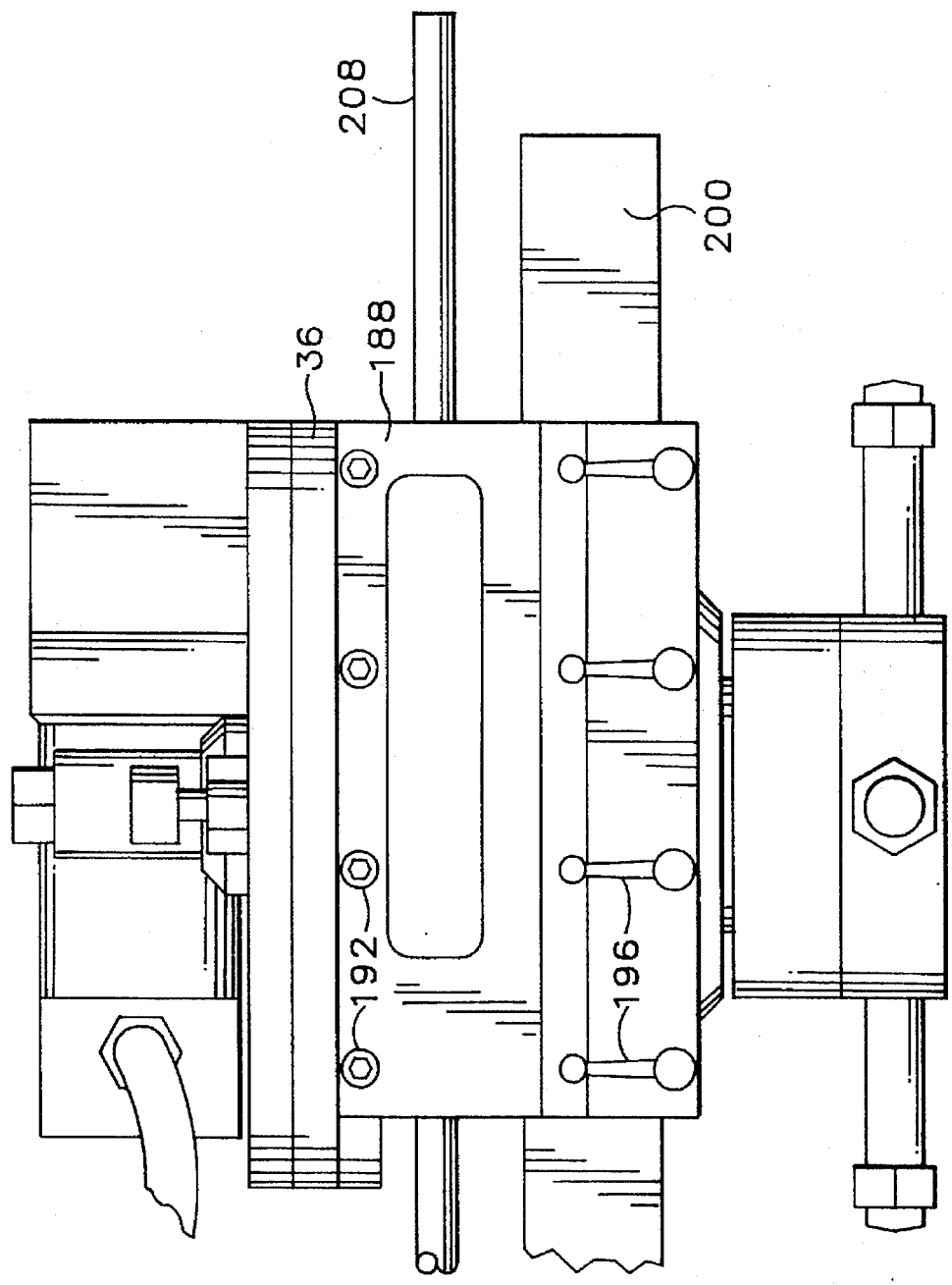
FIG. 9 is a rear elevation of the flange facer.

Referring to FIGS. 7, 8, and 9, the machine body 28 comprises a main subassembly 184 and a clamping jaw 188. The clamping jaw 188 is firmly attached along one edge to the main subassembly 184 by screws 192, and clamping screws 196 are provided along an opposite edge of the clamping jaw. The clamping screws 196 can readily be tightened and loosened by hand, without using a tool. The main subassembly 184 and the clamping jaw 188 define a rectangular channel through which a tool bar 200 extends. Loosening the clamping screws 196 allows the tool bar 200 to be moved longitudinally in the channel, whereas by tightening the clamping screws 196, the bar 200 is firmly clamped against longitudinal movement relative to the machine body 28.

The take-off shaft 142 is provided at one end with a crank 202 for rotating the shaft 142 by hand if desired and at its opposite end with a bevel gear 204 that is received in a recess 206 of the clamping jaw. A coupling shaft 208 extends through the recess 206 parallel to the tool bar 200. A bevel gear 210 is fitted on the coupling shaft 208 so that the coupling shaft is slidable lengthwise of the gear 210 but is held against rotation relative thereto by engagement of a key (not shown) in a groove 214. The bevel gear 210 is in meshing relationship with the bevel gear 204 and so rotation of the take-off shaft causes rotation of the coupling shaft.

Referring to FIGS. 1 and 2, the tool bar 200 is formed with a feed rack 218 and carries a tool head 222. The tool head 222 comprises a main tool head body 226 provided with a circularly curved dovetail tenon 230, and a tool base 234 formed with a corresponding dovetail groove 238. The tool base is therefore turnable relative to the main body 226 about a horizontal axis, which is perpendicular to the tool bar. The tool base 234 is formed with a linear dovetail groove 242, and a tool carrier 246 is provided with a linear dovetail tenon 250 that is fitted in the groove 242. The tool carrier 246 is therefore movable relative to the tool base 234 along an axis that is perpendicular to the axis of turning movement of the tool base 234 and is formed with a rack 252. A cutting tool bit 254 is clamped in position relative to the tool carrier by use of a screw 258.

Figure 10:
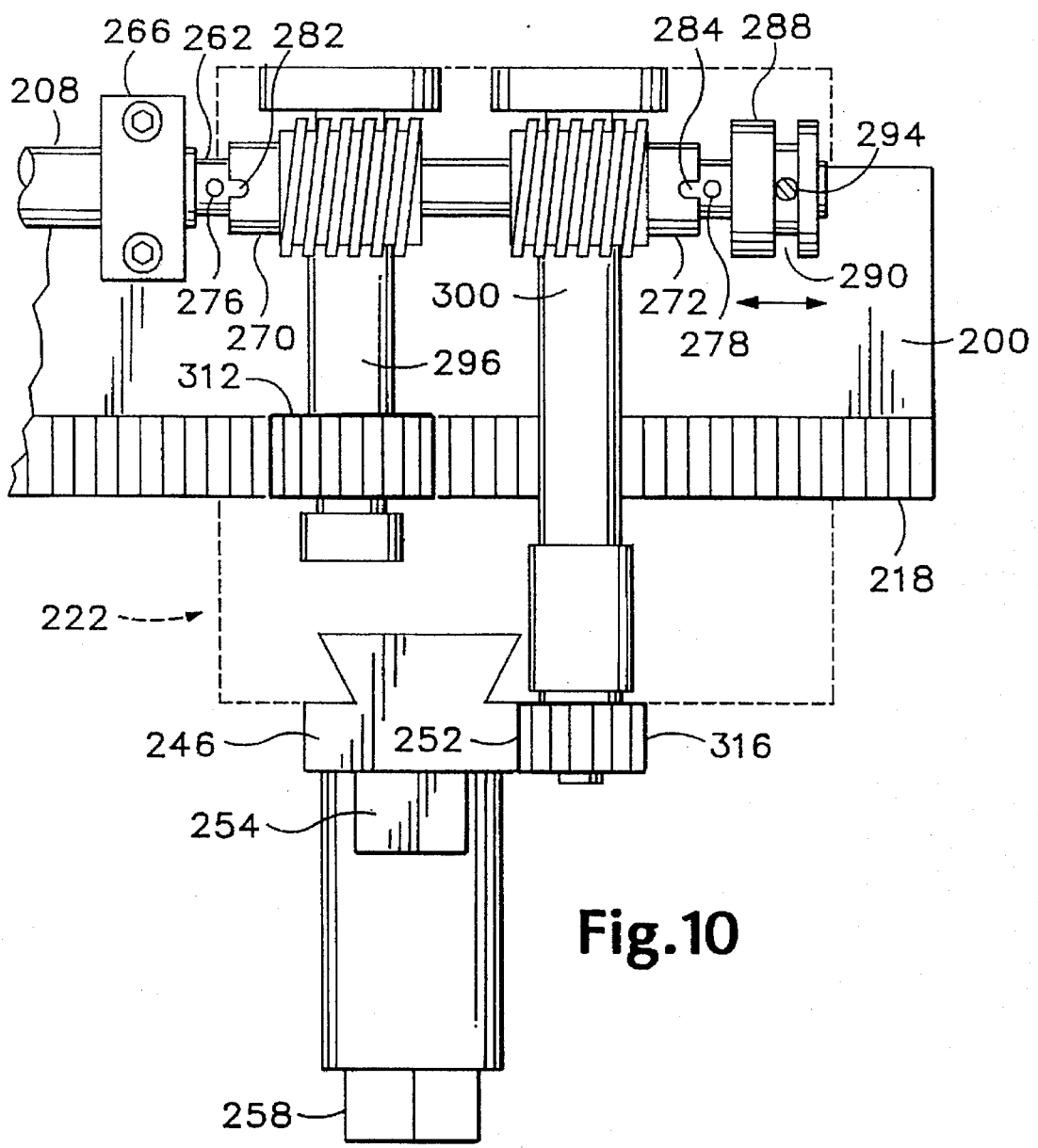
FIG. 10 is an enlarged view of a detail of the tool head assembly, and illustrates a radial feed worm and an axial feed worm, the radial and axial feed worms being in meshing relationship with respective worm gears that are not shown in FIG. 10.
Figure 11:
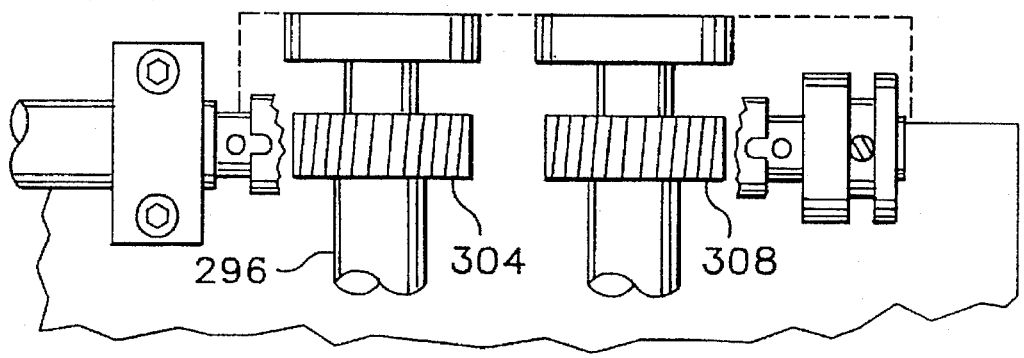
FIG. 11 is a partial view of the detail shown in FIG. 10 with the worms omitted so that the worm gears can be seen.

Referring to FIGS. 2 and 10, the tool head body 226 accommodates a coupling rod 262. The coupling rod is connected to the coupling shaft by a connector 266.

The tool head body 226 also accommodates two worm gear sleeves 270 and 272, which are mounted in the body 226 by means of bearings (not shown) that allow the sleeves to rotate but hold them against axial movement. The coupling rod 262 extends coaxially through the sleeves 270 and 272. Coupling pins 276 and 278 project radially from the rod 262, and the sleeves 270 and 272 are formed with notches 282 and 284 suitable for receiving the pins 276 and 278 respectively.

Figure 12:
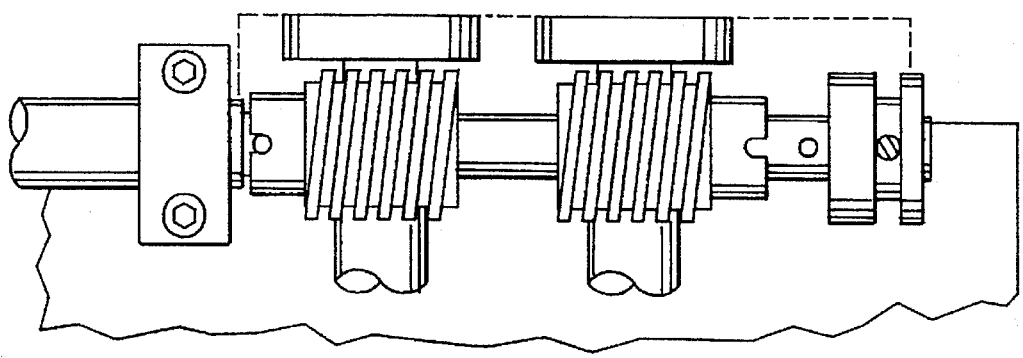
FIG. 12 is a partial view of the detail shown in FIG. 11 with the drive shaft coupled to the radial feed worm.
Figure 13:
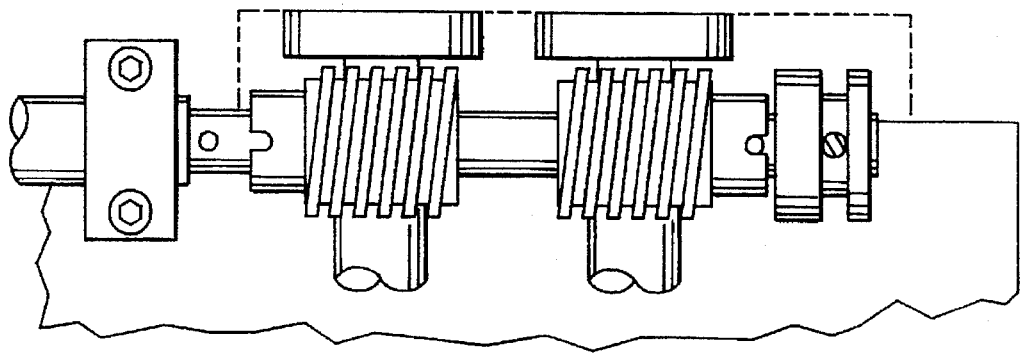
FIG. 13 is similar to FIG. 13 except that it shows the drive shaft coupled to the axial feed worm.

At the end to the right of FIG. 10, the rod 262 carries a shift ring 288. The shift ring 288 defines a circumferential groove 290. An L-shaped tool head control crank 298 is mounted on top of the main body 226 and has three detented positions established by respective recesses in a top plate of the main body 226. A pin 294 extends from the short arm of the L-shaped control crank 298 into the circumferential groove 290. Moving the control crank through its range of angular movement therefore has the effect of shifting the rod 262 axially relative to the main body 226. In the center position of the crank 298, neither of the pins 276 and 278 is engaged with its notch 282 or 284. When the crank is swung to the upper position shown in FIG. 2, the rod 262 is displaced to the right of FIG. 10 and the pin 276 engages the notch 282 as shown in FIG. 12. The coupling shaft 208 thereby drives the worm gear sleeve 270. Alternatively, when the crank is swung to the lower position shown in FIG. 2, the rod 262 is shifted to the left of FIG. 10 and the pin 278 engages the notch 284 (FIG. 13) and the worm gear sleeve 272 is driven.

Two secondary shafts 296 and 300 extend perpendicular to the coupling rod 262 and carry respective worm gears 304 and 308 that are in engagement with the tool head drive worms 270 and 272 respectively. The shaft 296 carries a pinion 312 that is in meshing engagement with the feed rack 218, whereas the shaft 300 carries a pinion 316 that is in meshing engagement with the axial feed rack 252 of the tool carrier 246. It will be appreciated from the foregoing that in a first position of the crank 298, the coupling rod 262 is coupled drivingly to the pinion 312 and the tool head is driven lengthwise of the tool bar in a direction that depends on whether the wave cam ring 70 is above or below its neutral position, in a second position of the crank, the coupling rod 262 is coupled drivingly to the pinion 316 and the tool carrier 246 is driven along an axis having a component parallel to the central axis of the main spindle 24 in a direction that depends on whether the wave cam ring 70 is above or below its neutral position, and in the third position the coupling rod 262 is coupled to neither the pinion 312 nor the pinion 316. When the crank 298 is in its first or second position, the feed rate depends on the distance of the wave cam ring 70 from its neutral position.

When the flange facer has been installed and is in operation, the operator's head will usually be above the flange facer so that the operator can observe the facing operation. Referring to FIG. 2A, the main drive ring 36 extends upwardly into an annular recess 320 in the underside of the motor mount plate 32 and there is a narrow gap 324 between the main drive ring 36 and the interior surface of this annular recess. The gap has three legs, namely an inner leg that extends vertically upward, into the annular recess 320, an intermediate leg that extends horizontally across the base of the recess, and an outer leg that extends downward at about 45°. The diameter of the motor mount plate is about 20 cm and the gap is about 0.025 cm wide, and accordingly the area of the gap is about 1.57 cm$^2$.

Exhaust air from the motor passes through the gear box 44 and the hole 328 in the motor mount plate 32, and is able to expand into the cavity 332 between the machine body and the motor mount drive plate and escape into the ambient atmosphere through the gap 324 between the main drive ring 36 and the motor mount plate 32. Because the gap 324 defines a circuitous path for the exhaust air, the noise generated by the air expanding into the cavity 332 is muffled. The area of the gap 324 is greater than the area of hole 328 in the motor mount plate, and therefore the exhaust air expands in two stages, first into the cavity 332 defined between the machine body 28 and the motor mount plate 32 and then into the ambient atmosphere from the gap 324, and so the level of noise generated on the second stage expansion is considerably less than that which would be generated if the air escaped directly from the motor exhaust port into the ambient atmosphere. Moreover, because the gap 324 extends around the entire periphery of the motor mount plate and the outer leg of the gap 324 is directed downward, away from the operator's head, the noise energy is dispersed and the level of noise to which the operator is exposed is less than with a conventional flange racer driven by a similar sized motor.

It will be appreciated that the invention is not restricted to the particular embodiment that has been described, and that variations may be made therein without departing from the scope of the invention as defined in the appended claims and equivalents thereof.

I claim:

1. A portable machine tool comprising:

a main spindle having a central axis, a machine body that is rotatable relative to the main spindle about said central axis, a take-off shaft that is mounted in the machine body and is rotatable relative to the machine body about a second axis, a first coupling member that is rotatable about said second axis, a mechanism for converting relative rotation of the machine body and the main spindle about said central axis to reciprocating rotation of the first coupling member about said second axis, and a converting means effective between the first coupling member and the take-off shaft and having at least a first state in which it converts reciprocating rotation of the first coupling member to unidirectional rotation of the take-off shaft in a first rotational sense and also having at least a second state in which the first coupling member is uncoupled from the take-off shaft, and a switch means for switching the converting means between its first state and its second state.

2. A portable machine tool according to claim 1, wherein the converting means comprises a second coupling member that is rotatable about said second axis, a first clutch for converting reciprocating rotation of the first coupling member to unidirectional rotation of the second coupling member, and a third coupling member that is fixed against rotation relative to the take-off shaft, and wherein in the first state of the converting means the third coupling member is coupled to the second coupling member, whereby rotation of the second coupling member is imparted to the take-off shaft, and in the second state of the converting means the third coupling member is uncoupled from the second coupling member.

3. A portable machine tool according to claim 2, wherein the second coupling member and the third coupling member have respective confronting ends and have interengageable dogs projecting from the respective ends parallel to said second axis, and the switch means switches the converting means between its first and second states by displacing the third coupling member lengthwise of the take-off shaft to engage or disengage the dogs.

4. A portable machine tool according to claim 3, wherein the means for displacing the third coupling member along the take-off shaft comprises:

a displacement member that is fitted in the machine body and is displaceable therein relative to the machine body along said central axis, a yoke shifter that is moveable relative to the machine body along the central axis and is held against rotation relative to the machine body, the yoke shifter being coupled to the displacement member so that it is displaced relative to the machine body with the displacement member, and a yoke member carried by the yoke shifter, the yoke member being in operative engagement with the third coupling member such that displacement of the yoke shifter along the central axis effects displacement of the third coupling member along the take-off shaft.

5. A portable machine tool according to claim 4, wherein the displacement member is a ring that is fitted coaxially about the main spindle, and the machine tool comprises a mechanism that is moveable relative to the main spindle to effect displacement of the displacement member relative to the machine body along said central axis.

6. A portable machine tool according to claim 4, further comprising a machine body cover plate that is attached to the main spindle and is held against movement relative thereto, a control member mounted on the cover plate and moveable relative to the cover plate, and a means responsive to movement of the control member to displace the displacement member relative to the machine body.

7. A portable machine tool according to claim 4, comprising at least one link member coupling the displacement member to the main spindle in a manner that allows the displacement member to be displaced relative to the machine body axially of the main spindle but prevents rotation of the displacement member relative to the main spindle, and a cam sleeve that is rotatable relative to the main spindle and is effective against the link member to force the link member axially of the main spindle.

8. A portable machine tool according to claim 7, wherein the displacement member is a hollow cylindrical member mounted coaxially with the main spindle and the cam sleeve is a hollow cylindrical member mounted coaxially with the main spindle between the main spindle and the displacement member, and the link member comprises a pin that projects inwardly from the displacement member through a helical slot in the cam sleeve and runs in an axial groove in the main spindle.

9. A portable machine tool comprising:

a main spindle having a central axis, a machine body that is rotatable relative to the main spindle about said central axis, a take-off shaft that is mounted in the machine body and is rotatable relative to the machine body about a second axis, first and second coupling members that are rotatable about said second axis, a mechanism for converting relative rotation of the machine body and the main spindle about said central axis to reciprocating rotation of the first and second coupling members about said second axis, and a converting means effective between the first and second coupling members and the take-off shaft and having a first state in which it converts reciprocating rotation of the first coupling member to unidirectional rotation of the take-off shaft in a first rotational sense and the second coupling member is uncoupled from the take-off shaft, a second state in which it converts reciprocating rotation of the second coupling member to unidirectional rotation of the take-off shaft in a second rotational sense, and a third state in which the first and second coupling members are uncoupled from the take-off shaft, and a switch means for switching the converting means among its first, second, and third states.

10. A portable machine tool according to claim 1, wherein said first coupling member has a free end that is remote from said second axis, and the converting mechanism converts relative rotation of the machine body and the main spindle about said central axis to reciprocating movement of the free end of the first coupling member along said central axis, whereby the first coupling member undergoes reciprocating rotation about said second axis.

11. A portable machine tool according to claim 9, wherein each of said first and second coupling members has a free end that is remote from said second axis, and the converting mechanism converts relative rotation of the machine body and the main spindle about said central axis to reciprocating movement of the free ends of the first and second coupling members along said central axis, whereby the first and second coupling members undergo reciprocating rotation about said second axis.

* * * * *